United States Patent [19]

Harada et al.

[11] Patent Number: 4,687,817

[45] Date of Patent: Aug. 18, 1987

[54] NOVEL FUNCTIONALIZED RESIN DERIVED FROM POLYALLYLAMINE

[75] Inventors: Susumu Harada; Kiyoshi Shimizu; Masayuki Ujiie, all of Koriyama, Japan

[73] Assignee: Nitto Boseki Co. Ltd., Fukushima, Japan

[21] Appl. No.: 863,107

[22] Filed: May 14, 1986

Related U.S. Application Data

[62] Division of Ser. No. 670,545, Nov. 13, 1984, Pat. No. 4,604,451.

[30] Foreign Application Priority Data

Nov. 15, 1983 [JP] Japan ................................ 58-214777

[51] Int. Cl.$^4$ .............................................. C08F 8/30
[52] U.S. Cl. .................................. 525/375; 525/328.2; 525/359.3; 525/359.4; 526/304; 526/307
[58] Field of Search ................... 525/328.2, 375, 359.3, 525/359.4; 526/304, 307

[56] References Cited

U.S. PATENT DOCUMENTS

| | | | |
|---|---|---|---|
| 2,628,224 | 2/1953 | Cairns et al. | 526/307 |
| 3,395,134 | 7/1968 | d'Alelio | 526/307 |
| 3,520,855 | 7/1970 | Szita et al. | 526/307 |
| 3,666,810 | 5/1972 | Hoke | 526/307 |
| 3,696,085 | 10/1972 | Lederer et al. | 526/307.1 |
| 3,864,299 | 2/1975 | Kolb | 526/307 |
| 3,879,205 | 4/1975 | Fitzgerald et al. | 526/307 |
| 4,075,183 | 2/1978 | Kawakami et al. | 526/307.3 |
| 4,157,418 | 6/1979 | Heilmann | 526/263 |

*Primary Examiner*—Joseph L. Schofer
*Assistant Examiner*—Bernard Lipman
*Attorney, Agent, or Firm*—Bert J. Lewen; Henry Sternberg

[57] ABSTRACT

A new functionalized resin represented by the general formula was derived from polyallylamine.

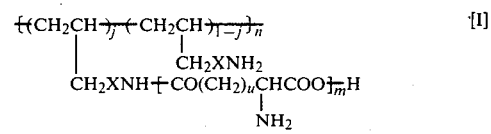

[wherein; X represents the general formula

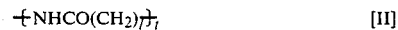

(t is 0 or 1, l is an integer of 1 to 20), $n \geq 10$, $0 < j < 1$, $u = 1$ or 2, and $m = 1$ or 2, with the proviso that t and m are not simultaneously 0].

The functionalized resin is preferably used for recovering heavy metals in waste water and for optically dissolving amino acids.

3 Claims, No Drawings

NOVEL FUNCTIONALIZED RESIN DERIVED FROM POLYALLYLAMINE

This is a divisional of co-pending application Ser. No. 670,545, filed on Nov. 13, 1984, now U.S. Pat. No. 4,604,451.

FIELD OF THE INVENTION

The present invention relates to a novel functionalized resin derived from polyallylamine, and more particularly to a functionalized resin having amino acid moieties introduced in side chains of the polyallylamine.

DESCRIPTION OF THE PRIOR ART

A number of reports are found on the synthesis of functionalized resins having α-amino acid moieties in side chains thereof. Processes for synthesizing these resins are roughly classified into two categories. One of them comprises preparing a vinyl compound having an amino acid moiety, followed by polymerizing it to form a functionalized resin. The other comprises selection of an appropriate resin as a carrier, and reaction of the resin with a suitably modified compound having an α-amino acid moiety to yield a functionalized resin.

As an example of the former category, there has been reported a process for producing polymers by reacting one or more of various amino acids with acrylic acid or to methacrylic acid to form a monomer, and polymerizing the resulting monomer. Such polymers include, for example, those of acryloyl or methacryloyl proline, valine, glycine, lysine, and tryptophan (see, e.g. N. Sakota et al., J. Poly. Sci. Poly. Lett. Ed., 12, 503 (1974); Y. Imanishi et al., Makromol, Chem., 177, 1401 (1976); A. Watanabe et al., J. Chem. Soc. Japan, 91, 874 (1970); K. Kondo et al., Makromol Chem., 176, 1307 (1975); and H. Sumita, Kobunshi, 17, 139 (1968)).

However, prior art processes of the former category for producing functionalized resins cannot be regarded as practically useful, since a side reaction such as a partial polymerization of the monomer will take place during its preparation and this will bring about difficulties in the isolation and purification of the monomer. In addition, when the resulting resins are used for certain purposes, it is not always favourable method that the resins have the large number of active sites in a polymer molecules.

There is known, as an example of the latter category, a process for producing a functionalized resin by bonding cystine to a poly(p-chloromethylstyrene) carrier.

In order to enhance the reactivity of functionalized resin having functional groups in side chains thereof, it is generally necessary to facilitate the association of reaction site in side chains with molecules of the reaction partner. Thus it is desirable that the side chain be long to some extent and flexible or free to bend. Accordingly, for the purpose of enhancing the reactivity of α-amino acid moiety in the above-mentioned functionalized resin, the use of a carrier resin having functional groups which is bonded with the backbone of the resin through a flexible methane or polymethylene group is preferred to the use of a resin such as known p-chloromethylstyrene resin having benzene rings in side chains that are rigid and bulky.

Further, as amino acids used, those which are cheap and available in large quantities are more profitable, and glutamic acid and aspartic acid meet such requirements. On the other hand, it is required for the carrier resin to have basic functional groups in side chains, for example, like polyamines, because glutamic acid and aspartic acid have carboxyl groups at the γ- and β-positions, respectively.

However, there is no report of successful synthesis of such a functionalized resin, because the synthesis of a polyamine containing no aromatic nucleus is extremely difficult and no effective and economical route has not yet been established for selective reaction of the γ-positioned carboxyl group of glutamic acid.

SUMMARY OF THE INVENTION

An object of the invention is to provide a novel funtionalized resin having amino acid moieties in side chains, which is derived from polyallylamine.

Another object of the invention is to provide an economical process for producing such a functionalized resin.

Other objects and advantages of the invention will be apparent from the following detailed description.

DETAILED DESCRIPTION OF THE INVENTION

As a result of extensive studies, the present inventors have been succeeded in obtaining functionalized resins, represented by the following general formula (I) from a starting material polyallylamine, economical production of which had been accomplished first by one (Harada) of the present inventors.

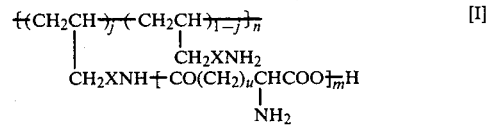

[In formula [I], X represents the formula [II]:

(wherein t is 0 or 1 and l is an integer of 1 to 20), n≧10, o<j<1, u=1 or 2, and m=0 or 1, with the proviso that t and m are not simultaneously 0.]

The resins represented by the above formula [I] are roughly divided into the following three types of polymers:

Polymer A (m = 1, t = 0)

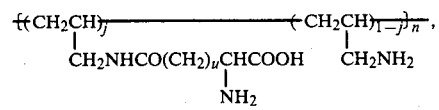

Polymer B (m = 0, t = 1)

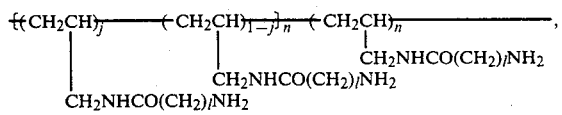

Polymer C (m = 1, t = 1)

-continued

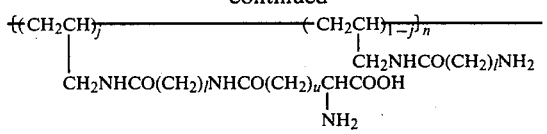

The above polymer A is obtained by reacting polyallylamine with N,N-phthaloylglutamic 1,5-anhydride represented by the formula:

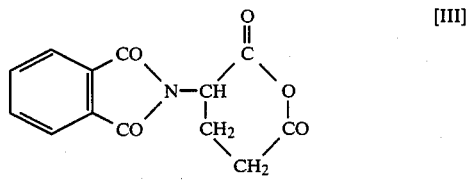

or with N,N-phthaloylaspartic 1,4-anhydride represented by the formula:

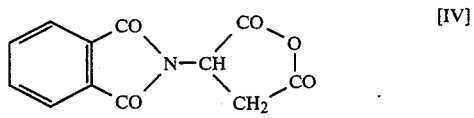

and then treating the intermediate product with hydrous hydrazine such as hydrazine hydrate.

Of these two N,N-phthaloylamino acid anhydrides, N,N-phthaloylaspartic 1,4-anhydride [IV] reacts at the sites of both α- and β-carboxyl groups and hence it is difficult to effectively introduce intended α-amino acid moieties in side chains. Therefore, the use of this amino acid anhydride is disadvantageous compared with the use of N,N-phthaloyl-glutamic 1,5-anhydride [III] which reacts only at the γ-carboxyl group, and the polymers produced by using the former anhydride have restricted applications.

It is also possible that the γ-carboxyl group of glutamic acid or the β-carboxyl group of aspartic acid is activated by some methods other than the above. For example, the amino acid can be converted into an ester (active ester) by reacting with p-nitrophenol, pentachlorophenol or N-hydroxysuccinimide, or can be converted into the acid halide, and thereafter the product (ester or acid halide) can be reacted with polymines of the general formula [I] (m=0). In this case, the α-amino acid moieties should be protected so as not to participate in said reaction. For the protection reactions and the protecting agents there can be utilized techniques which are utilized in the synthesis of peptides. Although being obtainable also according to the above mentioned methods using the ester or acid halide, the functionalized resin [I] of the invention is better synthesized through the route in which compound [III] or [IV] is used, because the above mentioned methods using the ester or acid halide require the complication of operations for the temporary protection of α-amino acid moieties.

The polymer B is obtained by reacting polyallylamine with a phthaloylamino acid, acid chloride thereof, or an acid anhydride (including asymmetric acid anhydrides derived from phthaloyl amino acid and other carboxylic acid), followed by treating the intermediate product with hydrous hydrazine such as hydrazine hydrate.

The polymer C is obtained by reacting the thus obtained polymer B with the compound such as N,N-phthaloylglutamic 1,5-anhydride (III) and N,N-phthaloylaspartic 1,4-anhydride (IV), followed by treating the intermediate product with hydrous hydrazine such as hydrazine hydrate.

The functionalized resin [I] of the invention can be used to recover heavy metals dissolved in water or to resolve racemates of amino acid or the like, by taking advantage of the metal chelating function of the α-amino acid structural parts thereof.

For use in such purposes, a functionalized resin [I] can be produced according to the process of the invention from an crosslinked polyallylamine.

The following examples illustrate the invention, but it is not limited to these examples.

Polyallylamine used in the following examples was prepared from polyallylamine hydrochloride which had been synthesized according to the process described in Japanese Patent Application No. 54988/83. That is, an aqueous solution of polyallylamine was prepared by passing an aqueous solution of 20% polyallylamine hydrochloride through a strong-basic ion exchange resin column. In most of the following experiments the aqueous solution of polyallylamine was used as such, but in other experiments a pure poly-allylamine obtained by freeze-drying of the aqueous solution was used in the form of methanolic solution.

REFERENCE EXAMPLE 1

Preparation of phthaloylglutamic 1,5-anhydride (1) In a solution of $Na_2CO_3$ (51.5 g) in water (350 ml) at 5° C. was dissolved L-glutamic acid (29.4 g). Carboethoxy phthalimide (59.6 g) was added to the solution and suspended therein and thereafter reacted at 350° C. for 30–40 minutes. Then the solution was freed from insoluble matter, adjusted to pH 2.5 with 6N-HCl, and allowed to stand at 0° C. The resulting precipitate was filtered, and recrystallized from water to give N,N-phthaloylglutamic acid, yield 35.7 g, 64.4%; specific rotation $[\alpha]_D^{25} = -48.6°(C=1, \text{dioxane})$.

(2) To phthaloylglutamic acid (27.7 g) obtained in (1) above was added acetic anhydride (40 ml) and they were reacted at 40°–42° C. for 3 hours. Then acetic anhydride (10 ml) was further added to react for 3 additional hours. After reaction, the resultant mixture was allowed to cool, washed well with ether-petroleum ether, and dried under reduced pressure to give phthaloylglutamic 1,5-anhydride, yield 21.8 g, 84.2%; specific rotation $[\alpha]_D^{25} = -44.5°(C=1.75, \text{dioxane})$.

REFERENCE EXAMPLE 2

Following the procedure of Reference Example 1, there were obtained N,N-phthaloyl aspartic acid and 1,4-anhydride thereof from aspartic acid.

EXAMPLE 1

Preparation of Polymer A (i) A solution of polyallylamine hydrochloride (4.68 g) in water (50 ml) was passed through an Amberlite-402 column to prepare an aqueous solution of polyallylamine. This solution was concentrated to a volume of about 10 ml, and acetic acid of 9 times the volume of the solution was added. Then N,N-phthaloylglutamic 1,5-anhydride (12.96 g) from Reference Example 1 was added to the mixture and they are reacted at 60°–65° C. for 1.5 hours. The reaction mixture was then allowed to cool, and poured into ethyl acetate. The formed precipitate was collected by filtration, and dried to give poly[γ-allylamine(N-phthaloyl)glutamic acid](11.26 g).

IR absorption spectrum to this polymer showed absorptions at 1700 cm$^{-1}$ and 1640 cm$^{-1}$ assigned to CO and NHCO, respectively. The specific rotation $[\alpha]_D^{25}$ was $-35.5°$(C=1, DMSO). The molar fraction of phthaloyl-glutamic acid attached was about 50%, as determined from IR and UV absorption spectra and specific rotation.

From the above data, this polymer is concluded to have the following structure:

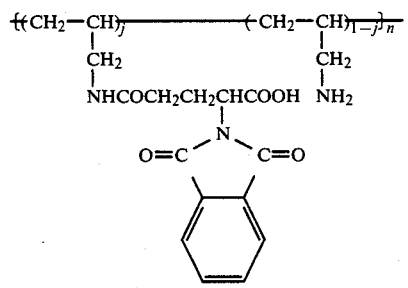

(ii) After poly[γ-allylamide(N-phthaloyl)glutamic acid](1.0 g) from (1) above was dissolved in DMSO (50 ml) by heating, hydrazine hydrate (10 g) was added thereto, and the mixture was stirred at room temperature for 22 hours. The formed precipitate was filtered, washed with DMSO and then with water, and dissolved in 1N-HCl (19 ml) at room temperature. The solution was poured into acetone, and the formed precipitate was collected by filtration, and dried to give poly(γ-allylamideglutamic acid) (0.65 g).

IR absorption spectrum of this polymer showed absorptions at 1720 cm$^{-1}$ and 1640 cm$^{-1}$ assigned to C=O and NHCO, respectively. The specific rotation $[\alpha]_D^{25}$ was 14.1°(C=1, H$_2$O). UV absorption spectroscopy and proton NMR absorption spectroscopy indicated that the polymer had no aromatic nucleus. From these results, it is concluded that the polymer has the following structure:

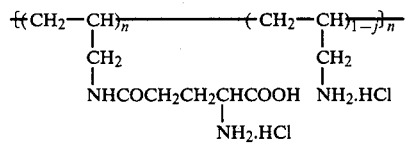

EXAMPLE 2

Preparation 1 of Polymer B (i) A mixture of phthalic anhydride (500 g) and β-alanine (267 g) was fused by heating at 200° C. for 15 minutes, and poured into water (1500 ml). The formed precipitate was collected by filtration, and recrystallized from ethanol to give phthaloyl-β-alanine (hereinafter referred to as pht-βAla), yield 537 g, 81.6%.

Then Pht-βAla (43.9 g) was mixed with thionyl chloride (82 ml) and they were reacted by heating at 50° C. for 30 minutes. The resultant mixture was allowed to cool, and the excess of thionyl chloride was distilled off. The residue, solidified entirely, was purified with petroleum ether to tive N-phthaloyl-β-alanine chloride (hereinafter referred to as Pht-βAlaCl), yield 45.8 g, 96.4%.

A solution of Pht-βAlaCl (45.8 g) in acetone was added dropwise to a mixture of a 13.6% aqueous polyallylamine solution (81.7 g), triethylamine (21.6 g), and acetic acid (247 ml) under cooling with ice, and they were reacted for 6 hours. Then the acetone was removed by distillation under reduced pressure, and the residue was poured into ethyl acetate (3000 ml). The formed precipitate was collected, and purified with methanol-ethyl acetate to give poly [β-allylamide (N-phthaloylamino) β-alanine], yield 39.0 g.

The resin was treated with conc. HCl and with acetone, and filtered and dried. Results of IR absorption spectroscopy (absorptions at about 1700 cm$^{-1}$ and about 1640 cm$^{-1}$ assigned to C=O and NHCO, respectively), UV absorption spectroscopy (an absorption in 200–250 nm assigned to phthaloyl groups), and elementary analysis have revealed that this resin is N-phthaloyl-polyamidepolyamine having the following structure:

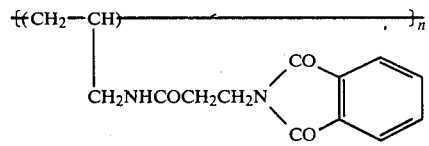

(ii) Phthaloyl-containing polyamidepolyamine (10.0 g) from (i) above was dispersed in DMSO (100 ml), and hydrazine hydrate (50 ml) was added thereto and they were reacted at 60° C. for 10 hours. Then the resulting precipitate was filtered, and dissolved in a mixture of conc. HCl (20 ml) and water (10 ml). The solution was poured into acetone (500 ml), and the precipitated polymer was filtered and dried.

IR absorption spectrum of this polymer (absorptions at about 1700 cm$^{-1}$ and about 1640 cm$^{-1}$ assigned to C=O and NHCO, respectively) and UV absorption spectrum thereof (no absorption assigned to the phenyl group was observed) have indicated that this polymer is concluded to be a polyamine having the following structure:

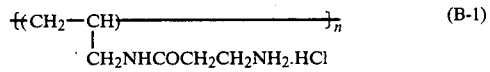

(B-1)

EXAMPLE 3

Preparation 2 of Polymer B (i-a) N-phthaloylglycine chloride (hereinafter referred to as Pht-Gly-Cl) (22.4 g) prepared according to the procedure of Example 2-(i) was dissolved in acetone (40 ml). The solution was added dropwise to a mixture of a 13.6% aqueous polyallylamine solution (42.0 g), triethylamine (10.1 g), and acetic acid (126 ml). Then a resin (16.5 g) was obtained in the same manner as in Example 2-(i), yield 16.5 g.

(i-b) To Pht-Gly-Cl (22.7g) and acetic acid (6.0 g) dissolved in tetrahydrofuran (130 ml) was added dropwise triethylamine (14 ml). Regardless of immediate appearance of a precipitate, the reaction was continued overnight. The resulting precipitate was filtered, and the filtrate containing glycylacetic anhydride was used as such in the next step.

Acetic acid (100 ml) was added to a solution of polyallylamine hydrochloride (9.4 g) in water (30 ml). Regardless of immediate precipitation of a polymer, a solution of triethylamine (10.1 g) in acetic acid (50 ml) was added to the mixture, giving a homogeneous solution [a triethylamine-treated polyallylamine solution (PAA-Et₃N solution)].

On addition of the above solution of glycylacetic anhydride to the PAA-Et₃N solution, a polymer precipitated immediately. After 3-hour continuation of the reaction, the precipitate was filtered, and dissolved in a mixture of conc.HCl (20 ml) and water (20 ml). The solution was poured into acetone (1500 ml), and the formed precipitate was filtered and dried.

(i-c) To Pht-Gly-Cl (24.6 g) and phthaloylglycine (22.6 g) dissolved in tetrahydrofuran (200 ml) was added dropwise triethylamine (15.4 ml) under cooling with ice. While a precipitate appeared simultaneously with the addition, the reaction was continued for 1-2 hours. Then the precipitate was filtered, and the filtrate containing diphthaloylglycine was used as such in the next step.

A solution (50 ml) of triethylamine (10.1 g) in acetic acid was added to a dispersion of polyallylamine hydrochloride (9.4 g) in acetic acid (100 ml). Then water (30 ml) was added to the mixture to form a homogeneous solution.

On addition of a solution of diphthaloylglycine anhydride in tetrahydrofuran to the resulting solution, a polymer precipitated immediately. The reaction was continued at room temperature. Then the supernatant was removed by decantation, and the residue was washed with tetrahydrofuran and then with ethyl acetate and dissolved in conc. HCl (40 ml). The polymer was reprecipitated from the solution with acetone (1500 ml).

IR absorption spectrum (absorptions at about 1700 cm⁻¹ and about 1640 cm⁻¹ assigned to C=O and NHCO, respectively) and UV absorption spectrum (an absorption in 200-250 nm assigned to phthaloyl groups) of the resins prepared in (i-a), (i-b), and (i-c) have revealed that all the resins are N-phthaloyl-polyamidepolyamines of the following structure:

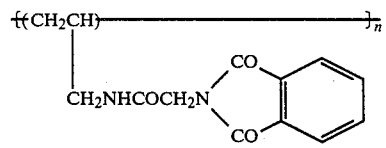

(ii) Each (10.0 g) of the phthaloyl-containing polyamidepolyamines obtained in (i-a), (i-b), and (i-c) was dispersed in DMSO (100 ml) and reacted with hydrazine hydrate (50 ml) at 60° C. for 10 hours. Then the precipitate was filtered, and dissolved in a mixture of conc. HCl (20 ml) and water (10 ml). The solution was poured in acetone (500 ml), and the precipitated polymer was filtered and dried.

From IR absorption spectrum of the thus obtained polymers (absorptions at about 1700 cm⁻¹ and about 1640 cm⁻¹ assigned to C=O and NHCO, respectively) and UV absorption spectrum thereof (no absorption assigned to the phenyl group was observed), these polymers are concluded to be polyamines having the following structure:

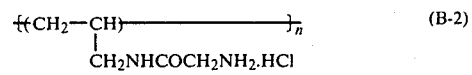

EXAMPLE 4

Preparation 3 of Polymer B (i) A mixture of phthalic anhydride (148 g) and γ-amino-n-butyric acid (103 g) was fused by heating at 180° C. for 5 minutes and then at 200° C. for 5 minutes, and poured into water (750 ml) to obtain Nγ-phthaloylamino-n-butyric acid, yield 191.8 g, 82.2%.

This acid (35.0 g) was reacted with thionyl chloride (62 ml) at 50° C. for 40 minutes. After reaction, the excess of thionyl chloride was distilled off. After addition of petroleum ether to the residue and cooling thereof, Nγ-phthaloylamino-n-butyric acid chloride was obtained, yield 36.9 g, 97.6%.

The Nγ-phthaloylamino-n-butyric acid chloride (36.9 g) as such was added to a mixture of a 13.6% aqueous polyallylamine solution (61.3 g), triethylamine (14.8 g), and acetic acid (184 ml). The acid chloride was dissolved not immediately but gradually and completely in about 20 minutes from the addition, forming a homogeneous solution. The resultant solution was poured into ethyl acetate (1500 ml). The formed precipitate was filtered, and dissolved in a mixture of conc. HCl (50 ml) and water (20 ml). The solution was poured into acetone (1000 ml), and the formed precipitate was collected by filtration, yield 20.2 g.

From IR absorption spectrum of the thus obtained resin (absorptions at about 1700 cm⁻¹ and about 1640 cm⁻¹ assigned to C=O and NHCO, respectively) and UV absorption spectrum thereof (an absorption in 200-250 nm assigned to phthaloyl groups), the resin is concluded to be an N-phthaloyl-polyamide polyamine having the following structure:

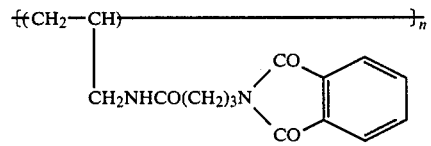

(ii) Phthaloyl-containing polyamide polyamine (10.0 g) from (i) above was dispersed in DMSO (100 ml) and reacted with hydrazine hydrate (50 ml) at 60° C. for 100 hours. Then the resulting precipitate was filtered, and dissolved in a mixture of conc. HCl (20 ml) and water (10 ml). The solution was poured into acetone (500 ml), and the precipitated polymer was filtered and dried.

From IR absorption spectrum of the thus obtained polymer (absorptions at about 1700 cm⁻¹ and about 1640 cm⁻¹ assigned to C=O and NHCO, respectively) and UV absorption spectrum thereof (no absorption assigned to the phenyl group was observed), this polymer is concluded be a polyamine having the following structure:

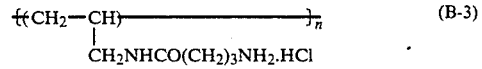

EXAMPLE 5

Preparation 4 of Polymer B (i) A mixture of phthalic anhydride (62.1 g) and ε-amino-n-caproic acid (50 g) was fused by heating at 180° C. for 10 minutes, and poured into water (750 ml) to give N$^\epsilon$-phthaloylamino-n-caproic acid, yield 96.1 g, 96.5%.

Then N$^\epsilon$-phthaloylamino-n-caproic acid (39.2 g) was reacted with thionyl chloride (62 ml) at 50° C. for 5 minutes. Thereafter the excess of thionyl chloride was distilled off. Petroleum ether was added to the residue, and the mixture was cooled to give N$^\epsilon$-phthaloylamino-n-caproyl chloride, yield 39.9 g, 95.1%.

A solution of N$^\epsilon$-phthaloylamino-n-caproyl chloride (39.9 g) in acetone was added to a mixture of a 13.6% aqueous polyallylamine solution (60.0 g), triethylamine (14.5 g), and acetic acid (181 ml). After this reaction, a polymer was obtained by the same post-treatment as in Example 4 (i), yield 22.1 g.

From IR absorption spectrum of the obtained resin (absorptions at about 1700 cm$^{-1}$ and about 1640 cm$^{-1}$ assigned to C=O and NHCO, respectively) and UV absorption spectrum thereof (an absorption in 200–250 nm assigned to phthaloyl groups), the resin has been confirmed to be N-phthaloyl-polyamidepolyamine having the following structure:

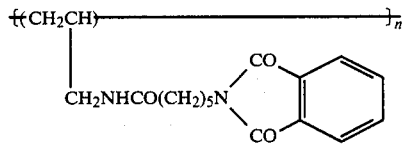

(ii) Phthaloyl-containing polyamide polyamine (10.0 g) from (i) above was dispersed in DMSO (100 ml), and reacted with hydrazine hydrate (50 ml) at 60° C. for 10 hours. Then, the resulting precipitate was filtered, and dissolved in a mixture of conc. HCl (20 ml) and water (10 ml). The solution was poured into acetone (500 ml), and the precipitated polymer was filtered and dried.

From IR absorption spectrum of the obtained polymer (absorptions at about 1700 cm$^{-1}$ and about 1640 cm$^{-1}$ assigned to C=O and NHCO, respectively) and UV absorption spectrum thereof (no absorption assigned to the phenyl group was observed), the polymer is concluded to be polyamine having the following structure:

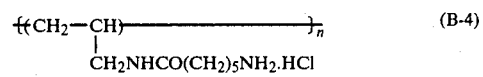

EXAMPLE 6

Preparation of Polymer C

Each (5 g) of polyamine hydrochlorides (B-1), (B-2), (B-3), and (B-4) prepared in Examples 2, 3, 4, and 5, respectively, was dissolved in water (50–80 ml), and passed through an Amberlite-402 column to give an aqueous polyamine solution. This solution, after concentration to a volume of 10–20 ml, was reacted with N,N-phthaloylglutamic 1,5-anhydride (1.1 equivalent to the amino groups) at 60°–65° C. for 1–3 hours. Then, the reaction mixture was allowed to cool, and poured into ethyl acetate. The formed precipitate was filtered, and treated with conc. HCl-acetone. In this way, there were obtained polyamine hydrochlorides which have phthaloylglutamic acid moieties in side chains of different lengths.

From IR absorption spectra of the thus obtained polymers (absorptions at about 1700 cm$^{-1}$ and about 1640 cm$^{-1}$ assigned to C=O and NHCO, respectively) and UV absorption spectra thereof (an absorption in 200–250 nm assigned to phthaloyl groups), it has proved that these polymers have the following respective structures:

| Starting material | Structure of product | Specific rotation $[\alpha]_D^{25}$ (c = 1, DMSO) |
|---|---|---|
| (B-1) | ⁅(CH$_2$CH)$_j$—(CH$_2$CH)$_{1-j}$⁆$_n$<br>    \|                    \|<br>CH$_2$NHCOCH$_2$CH$_2$NHCO   CH$_2$NHCOCH$_2$CH$_2$NH$_2$.HCl<br>                   \|<br>          CH$_2$CH$_2$CHCOOH<br>                 \|<br>        OC–N–CO   (C-1')<br>          (phenyl ring) | −32.3° |
| (B-2) | ⁅(CH$_2$CH)$_j$—(CH$_2$CH)$_{1-j}$⁆$_n$<br>    \|                    \|<br>CH$_2$NHCOCH$_2$NHCO   CH$_2$NHCOCH$_2$NH$_2$.HCl<br>                 \|<br>        CH$_2$CH$_2$CHCOOH<br>               \|<br>      OC–N–CO   (C-2')<br>        (phenyl ring) | −34.1° |

-continued

| Starting material | Structure of product | Specific rotation $[\alpha]_D^{25}$ (c = 1, DMSO) |
|---|---|---|
| (B-3) | ‡(CH₂CH)ⱼ―――――(CH₂CH)₁₋ⱼ)ₙ<br>    \|                                    \|<br>CH₂NHCO(CH₂)₃NHCO         CH₂NHCO(CH₂)₃NH₂HCl<br>                   \|<br>            CH₂CH₂COCOOH<br>                   \|<br>                   N<br>              OC´  `CO    (C-3')<br>                 \\__/<br>                 (phenyl) | −31.0° |
| (B-4) | ‡(CH₂CH)ⱼ―――――(CH₂CH)₁₋ⱼ)ₙ<br>    \|                                    \|<br>CH₂CHCO(CH₂)₅NHCO         CH₂NHCO(CH₂)₅NH₂.HCl<br>                   \|<br>            CH₂CH₂CHCOOH<br>                   \|<br>                   N<br>              OC´  `CO    (C-4')<br>                 \\__/ | −28.6° |

(ii) Each (1.5 g) of resins (C-1'), (C-2'), (C-3') and (C-4') prepared in (i) above was dissolved in DMSO (50 ml) by heating, and mixed with hydrazine hydrate by stirring at room temperature for 24 hours. The formed precipitate was filtered, washed with DMSO and then with water, and dissolved in 1N-HCl (20 ml). The solution was poured into acetone, and the formed precipitate was filtered and dried. In this way, there were obtained resins (0.7–0.8 g) to which glutamic acid moieties were attached.

IR absorption spectra of these polymers (absorptions at about 1700 cm⁻¹ and about 1640 cm⁻¹ assigned to C=O and NHCO, respectively) and UV absorption spectra thereof (the absorption peak assigned to the phenyl group which was observed in the spectra of the resins prepared in (i) above had disappeared) have indicated that the intended removal of phthaloyl groups was completely carried out in the preparation of these polymers.

Results of characterization of these polymers are as follows:

| Starting material | Structure | Specific rotation $[\alpha]_D^{25}$ (c = 1, H₂O) |
|---|---|---|
| (C-1') | ‡(CH₂CH)ⱼ―――――(CH₂CH)₁₋ⱼ)ₙ<br>    \|                                    \|<br>CH₂NHCOCH₂CH₂NHCO        CH₂NHCOCH₂CH₂NH₂.HCl<br>                   \|<br>            CH₂CH₂CHCOOH  (C-1)<br>                   \|<br>                NH₂.HCl | 13.0° |
| (C-2') | ‡(CH₂CH)ⱼ―――――(CH₂CH)₁₋ⱼ)ₙ<br>    \|                                    \|<br>CH₂NHCOCH₂NHCO              CH₂NHCOCH₂NH₂.HCl<br>                   \|<br>            CH₂CH₂CHCOOH  (C-2)<br>                   \|<br>                NH₂.HCl | 13.6° |
| (C-3') | ‡(CH₂CH)ⱼ―――――(CH₂CH)₁₋ⱼ)<br>    \|                                    \|<br>CH₂NHCO(CH₂)₃NHCO          CH₂NHCO(CH₂)₃NH₂.HCl<br>                   \|<br>            CH₂CH₂CHCOOH  (C-3)<br>                   \|<br>                NH₂.HCl | 12.8° |
| (C-4') | ‡(CH₂CH)ⱼ―――――(CH₂CH)₁₋ⱼ)ₙ<br>    \|                                    \|<br>CH₂NHCO(CH₂)₅NHCO          CH₂NHCO(CH₂)₅NH₂.HCl<br>                   \|<br>            CH₂CH₂CHCOOH  (C-4)<br>                   \|<br>                NH₂.HCl | 12.5 |

What is claimed is:

1. A process for producing a functionalized resin represented by the general formula:

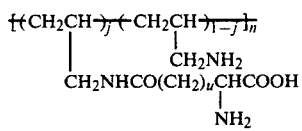

wherein $n \geq 10$, $0 < j < 1$ and $u = 1$ or 2, comprising reacting polyallylamine with N,N-phthaloylglutamic 1,5-anhydride represented by the formula

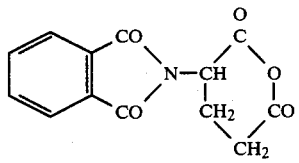 (III)

or N,N-phthaloylaspartic 1,4-anhydride represented by the formula

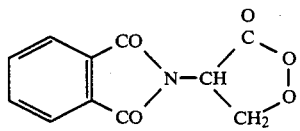 (IV)

and treating the resulting polymer with hydrous hydrazine.

2. A process for producing a functionalized resin represented by the general formula

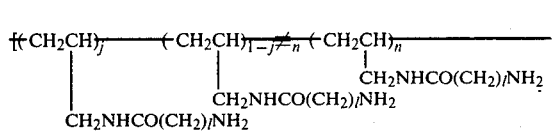

wherein $l$ is an integer from 1 to 20, $n \geq 10$ and $0 < j < 1$, comprising reacting polyallylamine with a phthaloylamino acid, chloride thereof, or acid anhydride thereof, and treating the resulting polymer with hydrous hydrazine.

3. A process for producing a functionalized resin represented by the general formula:

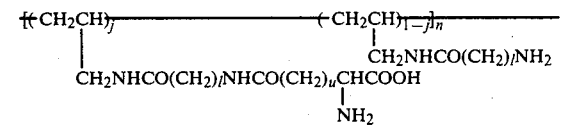

wherein $l$ is an integer from 1 to 20, $n \geq 10$, $0 < j < 1$, and $u = 1$ or 2, comprising reacting the functionalized resin defined in claim 2 with N,N-phthaloylglutamic 1,5-anhydride or N,N-phthaloylaspartic 1,4-anhydride, followed by treating the resulting polymer with hydrous hydrazine.

* * * * *